(12) United States Patent
Hata

(10) Patent No.: US 6,461,031 B1
(45) Date of Patent: Oct. 8, 2002

(54) SPOT LIGHT FIBER AND ILLUMINATING APPARATUS

(75) Inventor: Michiru Hata, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/623,262

(22) PCT Filed: Mar. 22, 1999

(86) PCT No.: PCT/US99/06205

§ 371 (c)(1),
(2), (4) Date: Aug. 28, 2000

(87) PCT Pub. No.: WO99/50697

PCT Pub. Date: Oct. 7, 1999

(30) Foreign Application Priority Data

Mar. 27, 1998 (JP) .......................................... 10-081394

(51) Int. Cl.[7] .................................. G02B 6/00
(52) U.S. Cl. ..................... 362/551; 362/558; 362/572; 385/901
(58) Field of Search .................... 362/551, 558, 362/572, 573, 574, 575; 385/901

(56) References Cited

U.S. PATENT DOCUMENTS

| 4,750,797 A | 6/1988 | Mori |
|---|---|---|
| 5,233,679 A | 8/1993 | Oyama |
| 5,298,327 A | 3/1994 | Zarian et al. |
| 5,337,381 A | 8/1994 | Biswas et al. |
| 5,459,645 A | * 10/1995 | Sattler et al. .................. 362/30 |
| 5,995,690 A | 11/1999 | Kotz et al. |

FOREIGN PATENT DOCUMENTS

| EP | 0 450 149 A1 | 10/1991 |
|---|---|---|
| GB | 2 154 761 A | 9/1985 |
| JP | 56-161704 | 12/1981 |
| JP | 61-093409 | 5/1986 |
| JP | 63-19604 | 1/1988 |
| JP | 1-169802 | 7/1989 |
| JP | 4070604 | 3/1992 |
| JP | 6-21940 | 3/1994 |
| JP | 7-13025 | 1/1995 |

* cited by examiner

Primary Examiner—Sandra O'Shea
Assistant Examiner—Ronald E. DelGizzi
(74) Attorney, Agent, or Firm—Stephen W. Buckingham

(57) ABSTRACT

A spot light fiber (100) which comprises a core (101) which can transmit the light entered from an incident end towards an output end (102) and output the light from the output end, and a light leaking means (103) positioned along the peripheral direction on the external periphery face near the output end of the core; characterized in that the light leaking means is formed by using a light diffusive-transmissive light leaking film.

3 Claims, 2 Drawing Sheets

SPOT LIGHT FIBER AND ILLUMINATING APPARATUS

DETAILED DESCRIPTION OF THE INVENTION

1. Technical field

The present invention relates to a spot light fiber which can leak light which has been inserted at an incident end from an output end and its vicinity, and can be used as a light emitting body of an illuminating apparatus of a spot light fiber type, and a spot light fiber type illuminating apparatus using this spot light fiber.

2. Background

As known to the art, a light fiber can transmit the light inserted at the incident end to the output end with only a small amount of light leaking from the external peripheral face of its core, and can emit the light with relatively high brightness at the output end. By using such characteristics, the optical fiber can be used as a light emitting body of a light fiber type illuminating apparatus.

An illuminating apparatus of such a spot light fiber type is disclosed in Japanese Utility Model Laid-Open Publication No. 56-161704, Japanese Patent Laid-Open Publication No. 1-169802 or the like. But in an ordinary light fiber, the light is emitted from the output end in an approximately parallel light beam, so that efficient extension cannot be provided in the illumination light and the illumination spot area cannot be made large.

A light fiber is known which can leak light from the part other than an output end, i.e., the external peripheral face of the core so that the light can be used as the illumination light. For example, in Japanese Patent Laid-Open Publication No. 4-70604, Japanese Patent Laid-Open Publication No. 1-58482, Japanese Patent Laid-Open Publication No. 6-21940 or the like is disclosed a light fiber having a light diffusive-reflective film adhered along the axial direction of the core on the external peripheral face of the core.

Such a light diffusive-reflective film, normally containing light transmissive resin and light diffusive-reflective particles, substantially does not allow the light to transmit therethrough. Rather, the light is reflected. Namely, in such a conventional light fiber as described above, a portion of light which reaches the interface between the light diffusive reflective film and the core is reflected by the light diffusive-reflective film so that the light leaks out of the core from the external peripheral face on the side opposite to the external peripheral face where the light diffusive-reflective film is positioned. As described above, in addition to the output end of the core of the light fiber, the external peripheral face also functions as a light emitting face. The light inserted into the incident end does not leak out of the core through the light diffusive-reflective film.

When the light diffusive-reflective film is used as described above, the light can be released along the axial direction of the core, and the light fiber can be used in place of a linear light source such as fluorescent tube or the like. However, the light fiber with a light diffusive-reflective film attached to it is not suitable for spot illumination.

Since the light diffusive-reflective film is normally not light transmissive, the size of the light leaking part is restricted, because the vicinity of output end of a core which becomes a light leaking part is covered by the light diffusive-reflective film itself when the light diffusive-reflective film is positioned as it is near the output end of the core. As the result, it becomes difficult to make the illuminated area (i.e., spot area) large.

SUMMARY OF THE INVENTION

The present invention provides a spot light fiber which can make the area which is irradiated by the light from the output end and the vicinity of the output end of the spot light fiber large. In another embodiment of the present invention, a spot light fiber type illuminating apparatus which can make the spot area large by efficiently using such a spot light fiber is provided.

The present invention provides a spot light fiber which comprises a core which can transmit the light inserted at an incident end toward an output end and output the light from the output end, and a light leaking means positioned along the peripheral direction on the external peripheral face near the output end of the core; characterized in that the light leaking means is formed by using a light diffusive-transmissive film. Preferably, the light leaking means circumscribes the core in a location adjacent the output end.

DETAILED DESCRIPTION OF THE PREFERRED EMBODIMENTS

FIG. 1 is a perspective view showing one embodiment of a spot light fiber of this invention. A spot light fiber 100 of this invention has a light leaking means 103 positioned along the peripheral direction on the external peripheral face near the output end 102 of the core 101. In the present specification, the peripheral direction is referred to as a direction normal to the axis of the core.

By using a light diffusive-transmissive light leaking film which allows the light to be diffused and transmitted as the light leaking means of the light fiber, the light leaking brightness from the outer peripheral face near the output end is efficiently improved. Accordingly, the leaked light from the light diffusive-transmissive light leaking film and the emitted light from the output end can be efficiently irradiated toward the illuminated area, thereby the efficient illumination angle (for example, an angle by which brightness more than 1,500 luxes can be obtained) is expanded, and the spot area is efficiently enlarged.

FIG. 2 is a perspective view of one embodiment of a light diffusive-transmissive light leaking film to be used for forming a light leaking means of a spot light fiber of this invention. In the drawing, reference numeral A shows the peripheral direction of the core.

A suitable light diffusive-transmissive light leaking film 200 to be used by this invention has:
 (i) a light transmissive base part 201 having two approximately parallel major faces; and
 (ii) a plurality of light transmissive convex parts 202 formed and erected integrally with the base part on one major face of the base part, each convex part having approximately the same height, with a top face 203 having an adhesive property and the refractive index being 1.1 or more.

The light leaking means of this invention can be formed by using the light diffusive-transmissive light leaking film. Specifically, this is accomplished by adhering the top face 203 of the convex part 202 of the light diffusive-transmissive light leaking film 200 on the external peripheral face of the core. The film and the core are positioned so that a void 204 can be retained between the core external peripheral face and the base part of the light diffusive-transmissive light leaking film, and between the convex part and the convex part of the light diffusive-transmissive light leaking film.

When the light diffusive-transmissive light leaking film 200 is adhered on the external peripheral face of the core, the light diffusive-transmissive light leaking film is oriented so that the direction A on FIG. 2 becomes normal to the axis of the core. That is, the convex part 202 of the light diffusive-transmissive light leaking film 200 runs perpendicular to the direction of the fiber.

Since such a light leaking means leaks the light by using the light scattering function by the concave-convex shape of the light diffusive-transmissive light leaking film, the diffusing reflection particles are not required to be contained in the light diffusive-transmissive light leaking film. The light transmissive rate of the film itself can be improved as high as possible. Thus, the brightness of the light to be illuminated through the light diffusive-transmissive light leaking film can be improved efficiently.

The refractive index of the convex part is normally 1.1 or more. The part of the light which reaches the output end and is not irradiated from the external peripheral face, in case that the light diffusive-transmissive light leaking film would not be provided, transmits through the light diffusive-transmissive light leaking film to leak out of the core. Namely, the light that reaches the face adhered with the concave part penetrates into the convex part and is reflected or scattered by the interface between the void and the convex part so that it leaks out of the core through the light diffusive-transmissive light leaking film.

The refractive index of the convex part is preferably 1.2 through 2.5. More preferably, it is in the range of 1.3 through 2.0. When the refractive index of the convex part is 1.2 or lower, it is possible that the brightness of the spot will not be improved. On the other hand, when it exceeds 2.5, the amount of the output light from the output end is lowered, thereby the brightness of the illumination spot is not improved.

The refractive index of the convex part is preferably almost the same as or larger than that of the core. The difference ($\Delta=F-C$) between the refractive index (C) of the core and the refractive index (F) of the light diffusive-transmissive light leaking film is normally in the range of −0.1 through 1.0.

The light transmission factor of the convex part is not restricted unless the effects of this invention are not damaged. In the entire zone of the wavelength of 400 through 800 nm, a value measured by a spectro-photometer is normally 70% or more.

A dimension of a void to be formed when the light diffusive-transmissive light leaking film has been adhered on the external peripheral face of the core is not restricted unless the effects of this invention are not damaged. For example, a distance between the top parts of two adjacent convex parts is normally 0.001 through 500 mm, preferably in the range 0.01 through 50 mm, and more preferably is 0.02 through 10 mm. The height of the void (interval from the core face to the bottom face of the concave part) is normally 0.001 through 10 mm, and is preferably in the range of 0.01 through 5 mm.

When these void dimension is smaller than the normal range, the amount of light leaking and the spot brightness may become low. When the void dimension is larger than the normal range, a part with the light diffusive-transmissive light leaking film being adhered thereto becomes bulky, thereby damaging the outer appearance of the spot light fiber. When the void dimension is too large in view of the elastic rate of the convex part, there is a great likelihood of difficult retaining the void.

An area of one convex top face of the light diffusive-transmissive light leaking film is normally $10^{-4}$ through 25 mm$^2$ and is preferably in the range of $10^{-3}$ through 10 mm$^2$. When the area of the concave top face is $10^{-4}$ mm$^2$ or smaller, there is a little likelihood that the scattering effects are lowered and the brightness is lowered. When it is 25 mm$^2$ or more, the spot area becomes too wide with a likelihood of the brightness near the spot enter is lowered.

Unless the effects of this invention are damaged, the light diffusive-transmissive light leaking film which does not have such concave-convex shape can be used as a light leaking means. A film having a flat adhering face can be used which includes, for example, light transmissive resin and bubbles scattered within the resin. Or a film can be used which has polymer particles scattered, having refractive index different from that of the resin, instead of the bubbles. In the case of the latter, the difference between the refractive index of the resin and the refractive index of the polymer particles is normally 0.05 or more.

Illuminating Apparatus

An illuminating apparatus of this invention has a spot light fiber having the above characters and a light source for providing the spot light fiber with light. The light emitted from the output end and the light leaked through the light diffusive-transmissive light leaking film can be used as the illuminating light. The light emitted from the output end can be efficiently irradiated toward the illuminated area, widen the efficient illuminating angle and efficiently enlarge the spot area. Normal lamps such as xenon lamp, halogen lamp, light emitting diode, fluorescent lamp or the like can be used as a light source. The consumption power of the light source is normally 10 through 300W.

Core

A fiber core of this invention is formed from the material which has transparency enough to transmit the light inserted into the interior of the core from one end to the other end. It is for example made of the material which has a refractive index in the range of 1.4 through 2.0. Such materials include, for example, quartz glass, optical glass, polymers or the like.

While a core is made of a solid core made of the transparent material, a liquid charged type core or the like can be used with liquid of relatively high refractive index such as silicone gel or the like being charged in a flexible plastic tube can be used. In a case of the solid core, the light diffusive-transmissive light leaking film is positioned and then, can be covered with clad to prevent the core from being damaged. A clad is made of a transparent material having a refractive index of less than that of the core.

A polymer which is a core material can be made of a light transmissive polymer such as acrylic polymer, polymethylpenten, ethylene-vinyl acetate copolymer, polyvinyl chloride, vinyl acetate-vinyl chloride copolymer or the like. The refractive index of the polymer is normally 1.4 through 1.7 and the entire ray transmitting factor is normally 80% or more. In order to give sufficient mechanical strength to the flexibility of the core itself, the polymer can be crosslinked.

A method of making the solid core will be described as follows by way of acrylic core.

The acrylic monomer (mixture) which is a core material is filled in a tube extended in a longitudinal direction and having an opening part at least one end, and then, the mixture is heated sequentially at temperatures of a reacting temperature or more as the reaction of the mixture is caused sequentially towards the opening end from another end side of the tube. Namely, the heating position is moved towards the opening end from another end side. The reaction is conducted while pressing the mixture with a pressure gas which comes into contact with the mixture. In order to completely finish the reaction after the heating has been finished to the opening end, it is preferable to further heat the whole tube for several hours.

Acrylic monomer which is a core material include, for example, (i) (meth)acrylate in which the Tg of homopolymer is higher than 0° C. (for example, n-butyl methacrylate, methyl methacrylate, methyl acrylate, 2-hydroxyethyl methacrylate, n-propyl methacrylate, phenyl methacrylate or the like), (ii) (meth)acrylate in which the Tg of homopolymer is lower than 0° C. (for example, 2-ethylhexyl methacrylate, ethyl acrylate, tridecyl methacrylate and dodecyl methacrylate or the like), or a mixture between (i) and (ii). In the case of the mixture, the mixing weight ratio (H:L) between the (meth)acrylate (H) of the (i) and the (meth)acrylate (L) of the (ii) is normally in the range of 15:85 through 60:40. As a crosslinking agent, multifunctional monomer such as diallyl phthalate, triethylene glycol (meth)acrylate, diethylene glycol bisallyl carbonate or the like can be added to the mixture.

The acrylic core formed as described above, can be made as a homogeneous polymer from one end of the core to another end. It has good light transmissive performance and sufficient mechanical strength to the flexibility of the core body. Further, the spot light fiber becomes easy to treat by using the acrylic core. Thus, the acrylic core is suitable for the core.

The tube to be used in the producing method is preferable to be fluoro polymer such as tetrafluoro ethylene-hexa fluoro propylene copolymer (FEP) or the like. The method of manufacturing such a flexible spot light fiber (core) is disclosed in Japanese Patent Laid-Open Publication No. 63-19604.

Any sectional shape of the core in the width direction of the core will be employed, such as circular, oval, semicircular, bow larger in area than semicircular, unless the effects of this invention are damaged. The diameter of the core, when the cross-section in the width direction is circular, is normally in the range of 3 through 40 mm, and preferably 5 through 30 mm.

Light Diffusive-transmissive Light Leading Film

One preferable embodiment of the light diffusive-transmissive light leaking film comprises, as described above, (i) a light transmissive base part having two approximately parallel major faces; and (ii) a plurality of light transmissive convex parts formed and erected integrally with the base part on one major face of the base part, each convex part having approximately the same height, with a top face having an adhesive property and the refractive index being 1.1 or more.

The light diffusive-transmissive light leaking film may be adhered on the core external peripheral face by using the self-adhesiveness of the convex part or by using a light transmissive adhesive agent. As the light transmissive adhesive agent can be used, for example, an acrylic pressure sensitive adhesive agent.

The elastic modulus of the convex part is properly decided so as to retain the void. The elastic modulus G in the 25° C. of the convex part is preferably in the range of $5\times10^5$ through $1\times10^{10}$ dyne/cm$^2$. When the elastic modulus is $5\times10^5$ dyne/cm$^2$ or lower, the convex part flows in plasticity as time passes, thereby making it difficult to retain the shape of the void. On the other hand, when it exceeds $1\times10^{10}$ dyne/cm$^2$, the core face may be damaged in the adhering operation of the light diffusive-transmissive light leaking film.

When the reduction of the $\log_{10}G$ is 1.0 or less in the range of 25° C. through 125° C., in addition to the restriction of the elastic modulus G, the retaining performance of the gap formed between the light diffusive-transmissive light leaking film and the core can be efficiently increased. When the reduction of the $\log_{10}G$ is 1.0 or larger, namely, when the variation in the temperature range of $\log_{10}G$ becomes -1.0 or lower, the convex part may flow in plasticity as time passes.

The elastic modulus G of the base part is not particularly restricted to, but it is suitable to be in the range similar to that of the convex part when the base part is formed integrally with the convex part. The "elastic modulus G" in the present specification is a value measured by the dynamic viscoelastic method with 1 rad/second frequency, in a sheer mode.

For example, acrylic polymer is used in order to form the concave part or/and the base part which has such predetermined elastic modulus. This type of polymer is prepared by polymerization of raw material components including, for example, alkyl (meth)acrylate, ethylenically unsaturated acid. Also, it can be prepared by the polymerization of raw material components including acryl-modified polymerizing prepolymer or oligomer such as urethan acrylate or the like. In addition to acrylic polymer, it can be used rubber polymer such as silicone rubber, butyl rubber stylene rubber or the like, or polymer such as polyurethane or the like.

The convex part can be of any shape unless the effects of this invention are damaged. Preferably the sectional shape is approximately rectangular. For example, the sectional shape of the convex part is rectangular 0.01 through 5 mm in width, or is trapezoidal 0.01 through 5 mm in upper bottom, and 0.02 through 10 mm in lower bottom. They are easy to give concave-convex shape as designed, which provides with sufficient area of contact face, and is easy to work.

The base part is made of a material which is the same as the convex part including crosslinked acrylic polymer. The base part is preferable to be formed integrally with the concave part although the light diffusive-transmissive light leaking film can be prepared by splicing with the base part and the concave part being prepared separately. The reason is that it is easy to give concave-convex shape as designed.

The thickness of the base part is normally 0.01 through 2 mm, preferably 0.05 through 1 mm, and more preferably 0.1 through 0.5 mm. When it becomes too thin, base part may break during use. When it becomes too thick, the light diffusive-transmissive light leaking film becomes voluminous, thereby damaging the outer appearance when it is positioned on the core face.

The voids (concave parts) between mutually adjacent convex parts are positioned to form regularly geometrical patterns across the approximately entire face of one major face of the base part. Such geometrical patterns are, for example, lattice pattern, zigzag, parallel stripe (a plurality of stripes are parallel) or the like. The number of the arrangements of the concave parts per unit area is normally 0.3 through 50/cm$^2$.

The concave parts can have various different shapes. For example, geometrical space such as circular cylinder, semicircular cylinder, prism, pyramid, circular cone, semicircular cone, truncated pyramid, circular truncated cone, spherical segment, ellipsoidal and so on can be provided. The concave part can adopt the composite shape of one type or two types or more selected from a group consisting of these shapes. The void between the concave part and the core face can be closed space or open space which communicates with the outer space.

The light diffusive-transmissive light leaking film is positioned so that the bottom face of the concave part may be away from the core, with the top face of the convex part being adhered on the external peripheral face of the core. When the shape or the position (namely, pattern) of the concave part has anisotropy within the horizontal face, it is preferable to position the light diffusive-transmissive light leaking film so as to leak the light with the highest brilliance towards the illumination spot. For example, when the concave part has a parallel stripe pattern, the length direction of these stripes is preferable to be positioned so as to go along the peripheral direction of the core (to be orthogonal to the axis of the core).

When a light leaking means is formed by using such a light diffusive-transmissive light leaking film, the axial length of the light leaking means is normally in the range of 3 through 50 mm, preferably 5 through 40 mm, and more preferably 10 through 30 nm. When the axial length of the light leaking means is smaller than the normal range, the light leaking brightness becomes low, and the efficient illumination angle (for example, an angle by which brightness of more than 1,500 lux can be obtained) cannot be made large. On the other hand, when it is larger than the normal range, the brightness of the output light from the output end becomes lowered so that there is a likelihood that the brightness near the spot center cannot be increased.

Such a light diffusive-transmissive light leaking film as described above is described in commonly assigned U.S. patent application Ser. No. 08/755767.

Preparation of Light Diffusive-transmissive Light Leaking Film

The light diffusive-transmissive light leaking film can be prepared by using, for example, acrylic polymer. The acrylic polymer is preferable to be a crosslinked one. The crosslinked acryl polymer can be prepared by polymerization of the raw material components substantially composed of, for example, alkyl (meth)acrylate, ethylenically unsaturated acid, and crosslinking agent monomer having two (meth)acrylic radicals or more within the molecule.

The alkyl (meth)acrylate (The wording means "alkyl acrylate" or "alkyl methacrylate.) includes those in which alkyl group is either of methyl, ethyl, isopropyl, butyl, isobutyl, 2-ethylhexyl, isooctyl, lauryl, stearyl, cyclohexyl, isobornyl, 2-hydroxyethyl, 2-hydroxypropyl, methoxyethyl, ethoxyethyl, dimethylaminoethyl, decylamonoethyl, glycidyl. The alkyl (meth)acrylate may be used alone or in combination of more than two.

The ethylenically unsaturated acid preferably includes (meth)acrylic acid (The wording means "acrylic acid" or if "methacryl acid"). The (meth)acrylic acid efficiently increases the cohesion force of the acrylic polymer to improve the shape retaining property and mechanical strength of the convex part. As another ethylenically unsaturated acid is used one type of β-hydroxyethyl carboxylic acid, itaconic acid, maleic acid, fumaric acid, or mixture of two types or more selected from them.

The blending proportion between alkyl (meth)acrylate (A) and ethylenically unsaturated acid (E) is selected so that the elastic modulus of the convex part (11) is in the predetermined range, but preferably is in the range of A:E=80:20 through 99:1.

The crosslinking agent monomer having two (meth) acrylic radicals or more within a molecule preferably includes 1,6-hexanediol diacrylate. The 1,6-hexane diol diacrylate efficiently increases the crosslinking density of acrylic polymer so as to improve the shape retaining property and the mechanical strength of the convex part for better balancing. The content of the crosslinking agent monomer is normally in the range of 0.5 through 5% by weight based on the entire raw material components.

Acryl modified prepolymer oligomer such as urethane acrylate or the like, instead of the ethylenically unsaturated acid and/or crosslinking agent monomer, can be used to prepare the crosslinked acrylic polymer. When such a material is used, the elastic modulus of the convex part can be improved efficiently and the shape retaining property of the convex part can be easily improved.

The acrylic polymer, by using a raw material component which includes above described each component as a starting material, can be obtained through polymerization with heat or irradiation rays such as ultraviolet rays, electron beam or the like. For example, the raw material components is contacted with a mold having the predetermined geometric configuration, then it is polymerized (including crosslinking) on the mold to form a light diffusive-transmissive light leaking film. In this case, the raw material components including no crosslinking agent monomer may be by partially polymerized in advance to prepare viscosity-adjusted partial polymerized syrup. Then the mixture between the syrup and the crosslinking agent monomer is put into contact with the mold, the polymerizing and crosslinking can be completed. In order to efficiently operate the polymerization, a polymerization initiator can be used. Such a polymerizing initiator is, for example, benzophenone optical initiator (for example, Irgacure 651™ made by Ciba Geigi Co.) or the like.

In one preferred embodiment of this invention, the light diffusion permeability light leaking film is produced by the following replication method.

The raw material components containing the above described material at a predetermined proportion and the polymerization initiator are put into a stirring apparatus to conduct an ultraviolet ray polymerizing operation while stirring. At this stage, the polymerization is conducted partially to prepare the partially polymerized syrup so that the viscosity may become a range of 100 through 100,000 cps. On addition of the crosslinking agent, a predetermined amount of the crosslinking agent monomer and the light initiator are added to the syrup and mixed until it becomes homogeneous to prepare the raw material components of the light diffusive-transmissive light leaking film. The stirring apparatus is normally purged with inert gas such as nitrogen gas or the like.

A mold for forming a light diffiusive-transmissive light leaking film having the predetermined geometric configuration (concave-convex) is prepared as follows. A positive mold composed of relatively hard, plastic or metal, having the predetermined geometric configuration is prepared. Acrylic, polycarbonate or the like are suitable plastic materials. A releasing resin is put into contact with the positive mold, and the releasing resin is hardened with ultra violet rays. It is released from the positive mold, so as to make a negative mold. A concrete example of a positive mold like this include "ACRYSUNDAY PLATE" series made by Acrysunday (Ltd.) Company. A concrete example of the releasing resin include the molding silicone SE9555 made by Toray-Dow Corning Ltd.

The raw material components of the light diffusive-transmissive light leaking film is put into contact with the negative mold and a transparent releasing film is placed on the components. At this time, when the components are polymerized and cross-linked the negative mold and the releasing film are positioned at a predetermined space so as to form a part which becomes a base part of the light diffusion permeability light leaking film and a part which becomes a convex part. In this condition, the ultraviolet rays are applied through the releasing film to complete the hardening reaction, and the negative mold and the releasing film are removed, thereby a light diffusion permeability light leaking film composed of the components hardened is obtained.

The releasing film is used for cutting off oxygen, and for making flat another major face of the light diffusive-transmissive light leaking film. Normally a flexible plastic film such as polyester (PET) or the like is used as the releasing film.

In order to decide the thickness of the base part, the following method can be adopted. Namely, the method comprises steps of pouring an excess of raw material components onto the negative mold, covering on it with a release film, so as to form laminated materials containing the components, and then, passing the laminated material through the gap of knife coater having a gap fixed to the given interval, discharging the excess portion of the raw material component from the edge part of the laminated material to adjust the thickness and the flatness of a part which becomes a base part.

When the ultraviolet rays are used as described above, the wavelength of the ultraviolet ray is in the range of 300 through 400 nm, and the illuminating intensity is in the range of 330 through 1,000 J/cm$^2$.

The light diffusive-transmissive light leaking film may contain various types of additives unless the effects of this invention are damaged. The additives are, for example, tackifier, plasticizer, ultraviolet ray absorbing material, antioxidant, coloring material, filler or the like.

A plastic film of non-tackiness can be laminated on the major face having no convex part of the base part. The light permeability factor of such a plastic film should be 80% or more at a value measured by a spectro-photometer in the entire zone of the wave length of 400 through 800 nm.

EXAMPLES

Although the present invention will be further described concretely by the following examples, the invention is not restricted by them.

Example 1

A spot light fiber of this Example was made from a combination of a core and a light diffusive-transmissive light leaking film to be described hereinafter.

(1) Core

A core part of a light fiber "(Commodity Number) EL700" made by Lumenyte Co., Ltd. was used. It is a solid core of 1 m in core length, 18 mm in diameter of the core section (circular), and 1.49 in refractive index.

(2) Light diffusive-transmissive light leaking film

A partially polymerized syrup by ultraviolet ray polymerization, was prepared from raw material components composed of 90 parts by weight of isooctyl acrylate, and 10 parts by weight of acryl acid, and spare components composed of 0.1 parts by weight of irgacure 651 as a light starting agent. To the syrup are added 1 parts by weight of 1,6-hexanediol diacrylate and 0.2 parts by weight of additional light starting agent (irgacure 651) as a crosslinking agent monomer. They are mixed until they became homogeneous to prepare the raw material components for the light diffusive-transmissive light leaking film.

The light diffusive-transmissive light leaking film of this example is composed of the ultraviolet hardened raw material components, and it was made by using the raw material components and a method of using the casting mold. As a releasing film was used PET film "(Trade Mark) Lumirror 50T (50 $\mu$m thick) made by Toray Co., Ltd.

The light diffusive-transmissive light leaking film of this example had a base part and a plurality of convex parts of approximately the height, and formed integrally with the base part with the concave-convex configuration being a parallel stripe. The sectional area of the concave part cut with a face vertical to the parallel stripe was approximately 0.4 mm$^2$, and the width of the top of the convex part was approximately 0.5 mm. The thickness of the base part was 0.2 mm. Further, the concave part was positioned at a proportion of five/cm.

The measured value of the elastic modulus G of the convex part of the light diffusive-transmissive light leaking film was measured under the above described conditions by using dynamic analyzer "model number: RDA II" made by Leometrics Co. A sample retainer to be used for measuring was a parallel plate of 7.9 mm in diameter. The elastic modulus G was 6.7×105 dyne/cm$^2$, and tackiness was proper. $\log_{10}G$ change (reduction) was calculated with variation values with G at 25° C. as a reference, which was read from viscoelastic spectrum obtained in the range of 25° C. through 125° C. Changes in $\log_{10}G$ was zero. The light transmissibility of the convex part measured by a spectro-photometer was approximately 80%, and the refractive index of the convex part and the base part was 1.50.

The light diffusive-transmissive light leaking film was slit along a direction parallel to the parallel stripe to a tape form of 56.5 mm in length (dimension in the length direction of the parallel stripe) and of 5 mm in width (dimension in a direction vertical to the length direction of the parallel stripe, i.e., dimension of the axial direction). Then, the side of convex part was directed to the core, and it was adhered on the external peripheral face near the output end, so that the peripheral direction of the core agrees with the stripe length direction of the light diffusive-transmissive film, thereby the spot light fiber of the present Example was made. Namely, the parallel stripes were positioned vertical to the axis of the core. The void corresponding to the concave part of the light diffusive-transmissive light leaking film was retained in shape and dimension even after five months since it was adhered on the core.

Comparative Example 1

A light fiber used as a core in the Example 1 without the light diffusive-transmissive light leaking film was made to a spot light fiber in this Example.

Evaluation of Lightness

The lightness of the illuminated area of the spot light fiber in the Example 1 and the comparative Example 1 each being prepared in the above described manner was evaluated as follows. As a illurninometer was used a lumino meter "(Commodity Number) T-1H" made by Minolta (Ltd.,) Co. As a light source was used a halogen lamp ("Commodity Number: JCR-30W" made by Iwasaki Electricity (Ltd.) Co. of 30W with a reflection mirror attached to it.

FIG. 3 is an arrangement view of a sample and a apparatus in the lightness evaluating test of the spot light fiber of this invention. In FIG. 3, the numbering 301 is a light source, 302 is a spot light fiber, the symbol L is the width of a spot light fiber, the symbol θ is a maximum angle (illumination angle) by which the lightness more than 1,500 luxes is obtained. point A and point B show the measured positions of the lightness.

As shown in FIG. 3, a spot light fiber was positioned in parallel to the floor face to introduce the light into the core from the incident end, and the light was applied at point A of the wall face (vertical to the floor face) away 15 cm from the output end in a direction parallel to the core. An area of the illumination spot including point A was seen larger in the Example 1, by comparison with the comparative Example 1.

The lightness at point A is 16,400 luxes in-the Example 1 and 16,300 luxes in the comparative Example 1. They were almost the same. But the lightness at point B where it is away 15 cm from the external peripheral face near the output end of the core in a direction vertical to the floor face, was 1,280 luxes in the Example 1, and 1,100 luxes in the comparative Example 1. Further, an illumination angle ($\theta$) by which the lightness more than 1,500 luxes could be obtained was 0 through 80° in the Example 1 and 0 through 60° in the comparative Example 1.

Example 2

The spot light fiber of this Example was made as in the Example 1, except that the width (dimension in the axial direction) of the light diffusive-transmissive light leaking film was changed to 15 mm.

The lightness was measured as in the Example 1. It was found out that high lightness was obtained in the illumination angle ($\theta$) of 0 through 90° with the lightness at point A being 16,200 luxes, and the lightness at point B being 1,610 luxes.

Example 3

The spot light fiber of this Example was made as in the Example 1, except that the width (dimension in the axial direction) of the light diffusive-transmissive light leaking film was changed to 25 mm.

The lightness was measured as in the Example 1. It was found out that high lightness was obtained in the illumination angle ($\theta$) of 0 through 90° with the lightness at point A being 16,400 luxes, and the lightness at point B being 1,850 luxes.

From the results of the Examples 1 through 3, it was found out that the lightness of a certain circular spot in the illuminated area could be increased by increasing of the width (dimension of the light diffusive-transmissive light leaking film in the axial direction of the core) of the light diffusive-transmissive light leaking film.

Figure 1:
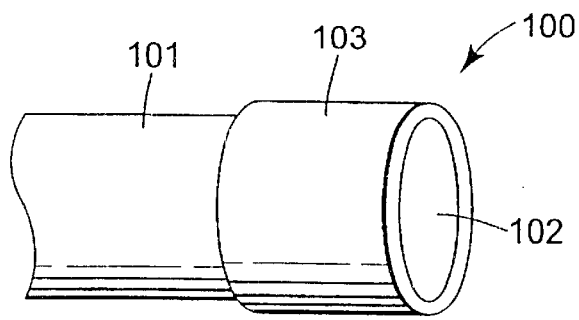
FIG. 1 A perspective view showing one Example of a spot light fiber of this invention.
Figure 2:
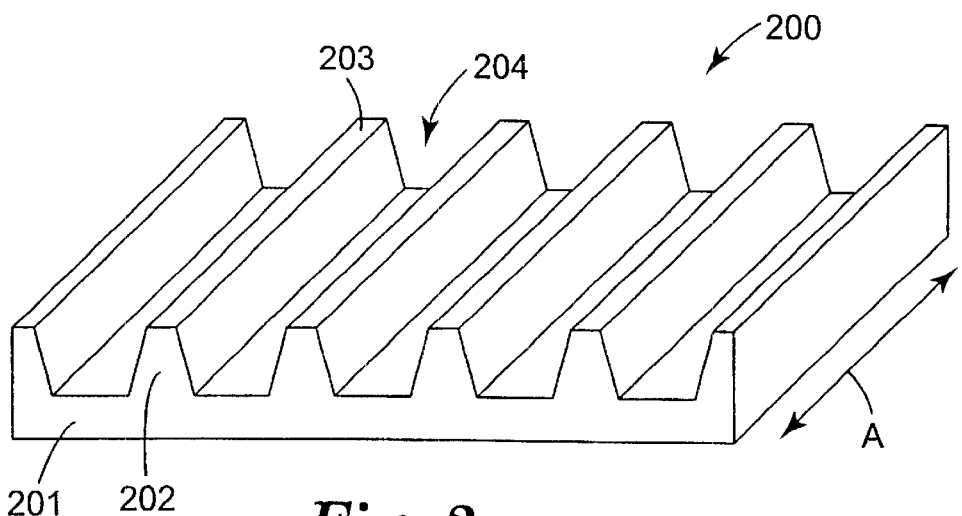
FIG. 2 A perspective view showing one Example of the light diffusive-transmissive light leaking film to be used to form the light leaking means of the spot light fiber of this invention.
Figure 3:
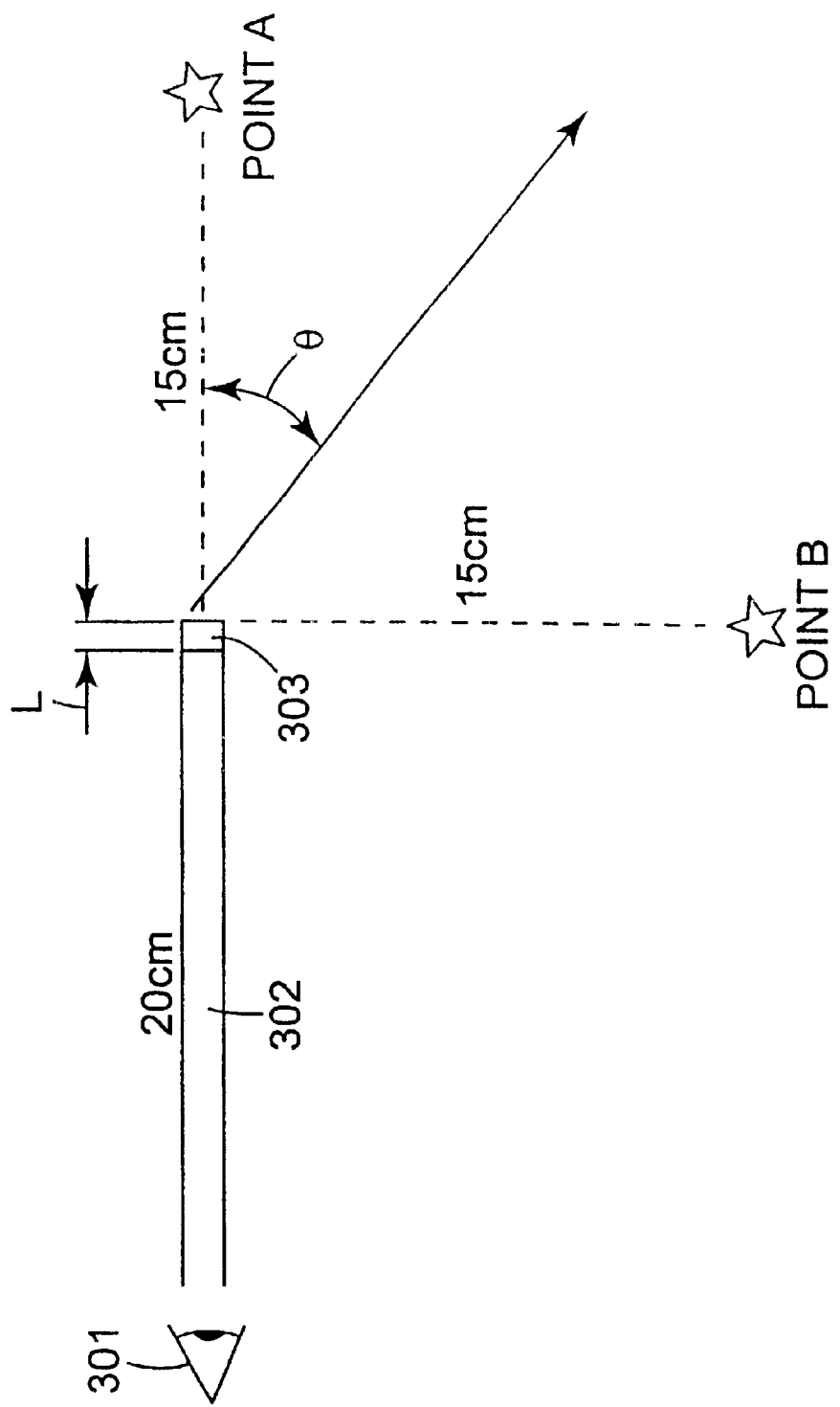
FIG. 3 An arrangement view of a sample and an apparatus in the lightness evaluating tests of the spot light fiber of this invention.

What is claimed is:

1. A spot light fiber comprising:

a core that can transmit the light insert at an incident end toward an output end and emit the light from the output end;

a light release element comprising a light diffusing film wrapped around the peripheral face of the light fiber at the output end, said light release element comprising a light transmissive base part having two approximately parallel major faces; and a plurality of light transmissive light extracting convex parts formed on one major face of said base part the outer surfaces of said convex portions being adhesively attached to said light fiber and forming gaps between said light fiber and said basic part between said convex parts.

2. A spot light fiber according to claim 1 wherein each of said convex portions has approximately the same height.

3. A spot light fiber according to claim 1 wherein said convex portions run transverse to the axis of said light pipe.

\* \* \* \* \*

UNITED STATES PATENT AND TRADEMARK OFFICE
CERTIFICATE OF CORRECTION

PATENT NO.   : 6,461,031 B1
DATED         : October 8, 2002
INVENTOR(S)  : Hata, Michiru It is certified that error appears in the above-identified patent and that said Letters Patent is hereby corrected as shown below:

Title page,
Item [57], ABSTRACT,
Line 5, delete "peripher" and insert -- peripheral --

Column 3,
Line 65, delete "difficult" and insert -- difficulty --

Column 5,
Line 40, delete "Leading" and insert -- Leaking --
Line 41, delete "diffiusive" and insert -- deffusive --

Column 8,
Line 44, delete "diffiusive" and insert -- diffusive --

Column 9,
Line 63, delete "diffiusive" and insert -- diffusive --

Column 10,
Line 3 and 28, delete "diffusive" and insert -- diffusive --
Line 54, delete "illurninometer" and insert -- illuminometer --

Column 12,
Line 34, delete "basic" and insert -- base --

Signed and Sealed this

Tenth Day of May, 2005

JON W. DUDAS
*Director of the United States Patent and Trademark Office*